J. P. OUTSON.
END-GATES FOR WAGONS.

No. 170,107.          Patented Nov. 16, 1875.

Attest:
Wm Bagger
C. A. Snow

Inventor:
Jacob P. Outson,
by Louis Bagger
his Atty.

UNITED STATES PATENT OFFICE.

JACOB P. OUTSON, OF RACINE, WISCONSIN, ASSIGNOR OF ONE-HALF HIS RIGHT TO WILLIAM ASBY, OF SAME PLACE.

IMPROVEMENT IN END-GATES FOR WAGONS.

Specification forming part of Letters Patent No. 170,107, dated November 16, 1875; application filed August 30, 1875.

*To all whom it may concern:*

Be it known that I, JACOB P. OUTSON, of Racine, in the county of Racine and State of of Wisconsin, have invented certain new and useful Improvements in End-Gates for Wagons; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
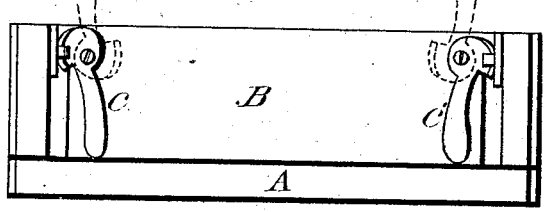
Figure 2:
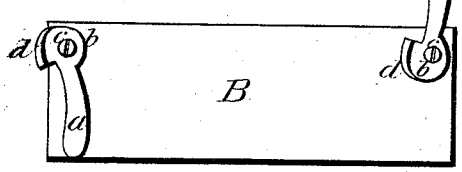
Figure 3:
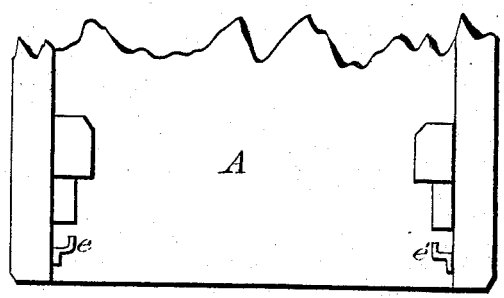
Figure 4:
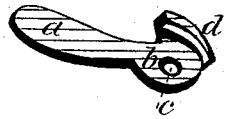

Figure 1 is a rear view of wagon-box, showing the gate and its attachments. Fig. 2 represents the gate, with attachments removed from the wagon. Fig. 3 is a top view of the rear part of wagon-box, and Fig. 4 is a perspective view of the fastening attachment.

Similar letters of reference indicate corresponding parts in all the figures.

This invention consists in the construction and arrangement of certain devices by which the end-gates of wagons or carts may be secured to the box or body in such a manner as to be perfectly noiseless, and so that the wear, by constant use, shall not affect the efficacy of said devices, as is ordinarily the case.

A represents the box or body of a wagon, and B is the gate. C and C' are levers, each consisting of a handle, $a$, and disk $b$, the latter having a raised wedge-shaped lip or flange, $d$. The disk $b$ is pivoted at $c$ to the upper corners of the gate, in such a manner as to turn eccentrically around the pivoting-point. $e\ e'$ are hooks or catches, secured onto the sides of the box A, so as to engage with the flanges $d$ of the disks $b$, when these are turned in the position shown in Fig. 1. The dotted lines in this figure represent the levers in the position for removing the gate.

The manner of operating my invention will be readily understood from the foregoing description, and needs no further elucidation.

The curved wedge-shaped lip or flange $d$, will, when the handle $a$ is turned for the purpose of fastening or locking the gate, enter so far up into the corresponding hook $e$, as to secure a perfectly close and tight fit, thereby avoiding rattling of the gate when the wagon is in motion. At the same time it will be observed, that by the configuration and arrangement of the wedge-shaped flange $d$, this may, as it wears off at the point, be pressed so much farther up toward its thicker portion, as to secure at all times a perfectly close joint with hooks $e$, so that the wear of the hooks $e$ and lip $d$, will not, in any way, affect the usefulness of the device.

I am aware that it is not new to use a pivoted latch-piece, consisting of a circular disk pivoted at its center, and having a circumferential snail-cam, in combination with a lid or cover, recessed at its side for the entrance of the cam; but this construction and combination I do not claim.

What I claim, and desire to secure by Letters Patent, is as follows:

The device for fastening end-gates for wagons herein described, consisting of the lever $a$, disk $b$, having wedge-shaped flange $d$, and pivoted eccentrically at $c$, in combination with the hooks or catches $e\ e'$, arranged and operating substantially as and for the purpose herein shown and specified.

In testimony that I claim the foregoing as my own I have hereunto affixed my signature in presence of two witnesses.

JACOB PEDER OUTSON.

Witnesses:
 WM. T. LEWIS,
 G. W. SPROAT.